May 20, 1941.    J. GIESEN ET AL    2,242,463
PURIFICATION OF SYNTHETIC METHANOL
Filed Aug. 23, 1938
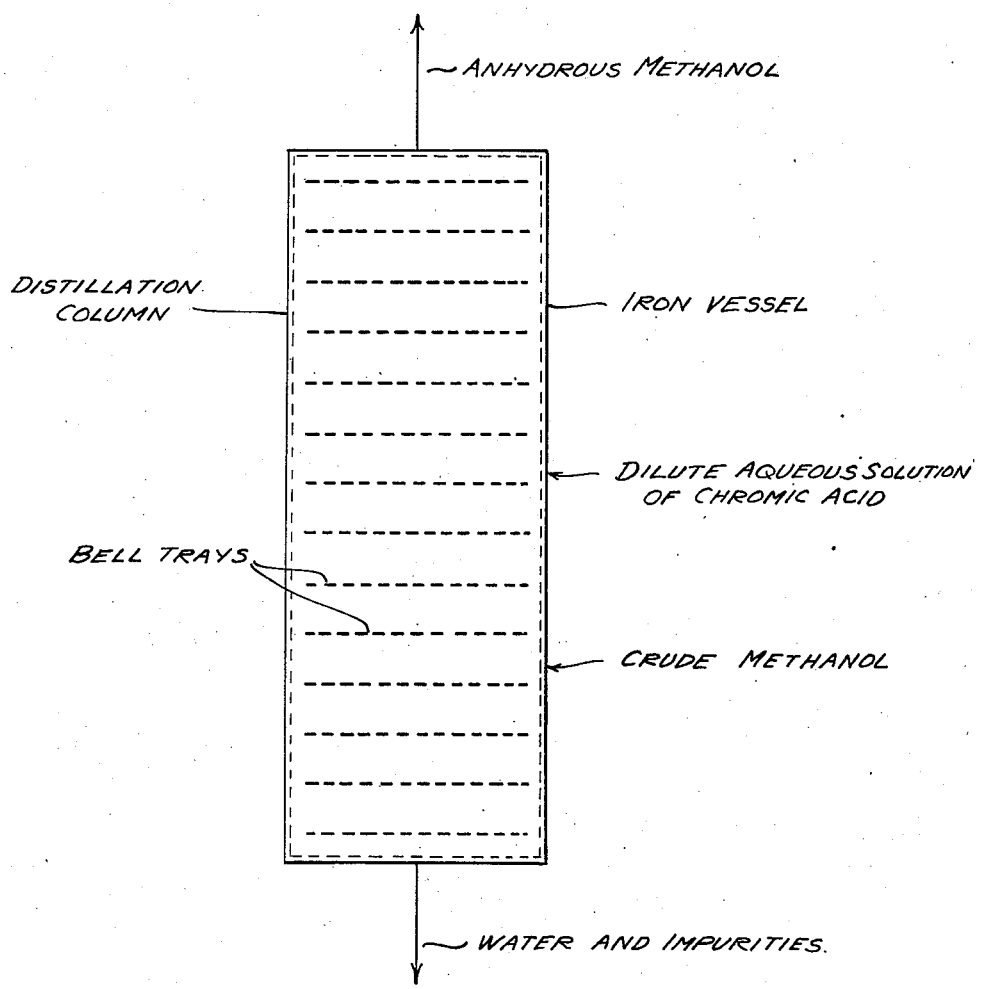
INVENTORS
JOHANN GIESEN
HELMUT HANISCH
PAUL HERRMANN GERICKE
BY THEIR ATTORNEYS Patented May 20, 1941

2,242,463

UNITED STATES PATENT OFFICE 2,242,463

PURIFICATION OF SYNTHETIC METHANOL

Johann Giesen, Helmut Hanisch, and Paul Herrmann Gericke, Leuna, Kreis Merseburg, Germany, assignors, by mesne assignments, to William E. Currie, New York, N. Y.

Application August 23, 1938, Serial No. 226,256
In Germany September 10, 1937

2 Claims. (Cl. 202—57)

The present invention relates to an improved process for the purification of synthetic methanol.

The recovery of a methanol corresponding in its purity to the commercial product from the crude product which has been obtained in known manner by the catalytic synthesis from the oxides of carbon and hydrogen under pressure, if desired with the simultaneous production of higher alcohols, or by reacting dimethylether obtained together with methanol in the said synthesis with steam over catalysts in known manner, is troublesome and expensive. It is true that most of the foreign constituents can be removed by distillation, so that a product is obtained which can be directly used for example for fuel purposes, but it still contains a series of constituents having an unpleasant odour, in particular unsaturated constituents which greatly impair its usefulness for example as a solvent or an agent protecting against freezing.

According to a known process it is possible to remove the said substances and to obtain a product corresponding to the pure methanol of commerce by treating the synthetic methanol in the presence of water with permanganate and zinc chloride. By reason of the strongly corrosive action of zinc chloride, however, the said process can only be carried out in expensive apparatus of corrosion-proof substances, in particular highly-alloyed steels. It is true that with permanganate alone a far-reaching removal of the impurities is effected, but even this is not sufficiently complete. Other oxidizing agents, such as hydrogen peroxide, perborates and percarbonates, are also incapable of removing the troublesome odour of the synthetic product. When using persulphates as oxidizing agents, mercaptans are formed which render the odour of the product worse.

We have now found that the said difficulties can be overcome by adding chromic acid in small amounts to the synthetic methanol to be purified, the process being diagrammatically depicted in the drawing.

It is especially suitable to use a continuously working distillation column to which at a certain height, for example in the middle part of the column where the methanol to be purified still has a considerable water content, a dilute aqueous solution of chromic acid is added in such an amount that the water flowing away at the lower end of the column is weakly acid to practically neutral.

Since chromic acid has a passivating effect on iron, the process may be carried out in any iron vessels without the latter being attacked. The oxidizing action of the chromic acid is restricted to the impurities and injurious further oxidation, as for example to formaldehyde or carbon dioxide, does not take place to a detectable extent.

In this manner, which is very simple and cheap in operation, there can be obtained from the synthetic methanol a methanol which is entirely free from objection as regards its odour.

The following examples will further illustrate how the present invention may be carried out in practice but the invention is not restricted to these examples.

*Example 1*

For the purification of methanol which has been obtained in known manner by the action of steam over a catalyst on a dimethyl ether separated by distillation from crude synthetic methanol obtained from carbon monoxide and hydrogen under a pressure of 200 atmospheres at elevated temperature in the presence of a zinc oxide—chromium oxide catalyst.

Into a bell-tray column of 600 millimetres diameter which is constructed of 65 bell-trays, there is introduced at the height of the 20th tray 800 litres per hour of a mixture of methanol and water containing about 40 per cent of methanol which is preheated to 90° C. At the top of the column about 320 litres of methanol per hour are withdrawn and at the bottom of the column the water is led away at a temperature of 103° C.

The following table gives the results obtained by simple distillation of methanol without the addition of an oxidizing agent (column II) by distilling the same methanol which has been treated before the distillation with an aqueous potassium permanganate solution (column III) and in column IV the result obtained from the same methanol when it is treated according to this invention by introducing a 2 per cent aqueous solution of 200 grams of chromic anhydride (CrO₃) per hour at the height of the 27th tray where the methanol still has a considerable water content.

For purposes of comparison, the values for pure commercial methanol are given in column I.

Table

|  | Pure methanol | Methanol prepared from dimethyl ether | | |
|---|---|---|---|---|
|  | I | II | III | IV |
| Specific gravity | 0.7918 | 0.792 | 0.792 | 0.792. |
| Bromine value | 0.9 | 3.5 | 1.0 | 0.8. |
| Acetone | 0.007% | 0.010 | 0.0030 | 0.0022. |
| Fe-content | 0.1 mg./l | 0.1 mg./l | 0.1 mg./l | 0.1 mg./l. |
| Permanganate stability | 40 minutes | 2 minutes | 11 minutes | 41 minutes. |
| NH₃-reaction | Negative | A trace | Negative | Negative. |
| Odour | Free from objection | Bad | Bad | Very good. |

The bromine value referred to was determined as follows:—

A solution of 13.2 grams of bromine in 1000 cubic centimetres of 50 per cent acetic acid is added drop by drop to 100 cubic centimetres of the methanol to be tested until a pale yellow colouration occurs. The bromine value is the number of cubic centimetres of the said solution which are necessary for giving yellow colouration. A solution of 0.05 gram of K₂Cr₂O₇ in 1000 cubic centimetres of distilled water served as comparative solution for the yellow colouration.

The permanganate stability referred to in the table was determined as follows:

100 cubic centimetres of the methanol to be tested are mixed with 1.3 cubic centimetres of a potassium permanganate solution 1:1000. The vessel containing the mixture is kept constant at a temperature of from 17° to 18° C. in a waterbath. The time taken for the red colouration which occurs to disappear is the measure for the permanganate stability.

The results of the investigation given in the table lead to the following conclusions:—

The product obtained by distilling the synthetic methanol without any addition (II) corresponds in single points to a rather far-reaching extent with the pure commercial product (I), so that it is suitable for numerous purposes, inter alia for the preparation of formaldehyde. The bromine value and permanganate stability are, however, considerably worse than with pure methanol and in particular the bad odour is objectionable for many purposes. An improvement is obtained by the treatment with permanganate (III), but the methanol thus purified is still greatly inferior to the pure methanol of commerce.

The methanol treated according to this invention (IV) is however, entirely equal to commercial methanol in every respect.

Example 2

Into a bell-tray column of 400 millimetres diameter and having 40 trays there are sprayed in per hour at the height of the 20th tray 100 litres of a crude methanol obtained from carbon monoxide and hydrogen under a pressure of 200 atmospheres at elevated temperature in the presence of a zinc oxide—chromium oxide catalyst which has been freed from gaseous constituents and dimethyl ether. At the height of the 30th tray there are introduced at the same time 4 litres per hour of a 2 per cent aqueous solution of chromic acid. The entirely anhydrous methanol leaving the top of the column is distinguished from that obtained by simple dehydration by a pure odour free from objection.

What we claim is:

1. In the production of pure methanol the steps which comprise distilling crude synthetic methanol obtained by catalytic hydrogenation of carbon oxide under pressure in a distillation column, adding thereto at a height of the said column where the methanol still has a considerable water content an aqueous solution of such an amount of chromic acid that the water flowing away at the lower end of the column is from weakly acid to practically neutral and withdrawing deodorized methanol from the upper end of said column.

2. In the production of pure methanol the steps which comprise distilling crude synthetic methanol obtained by catalytic hydrogenation of carbon oxides under pressure in a distillation column, adding thereto in the middle part of the said column such an amount of chromic acid that the water flowing away at the lower end of the column is from weakly acid to practically neutral and withdrawing deodorized methanol from the upper end of said column.

JOHANN GIESEN.
HELMUT HANISCH.
PAUL HERRMANN GERICKE.